United States Patent
Otani et al.

(10) Patent No.: US 9,434,254 B2
(45) Date of Patent: Sep. 6, 2016

(54) DISPLAY DEVICE

(71) Applicant: Yazaki Corporation, Minato-ku, Tokyo (JP)

(72) Inventors: Akihiro Otani, Shimada (JP); Kouhei Takeshita, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/538,252

(22) Filed: Nov. 11, 2014

(65) Prior Publication Data

US 2015/0138745 A1    May 21, 2015

(30) Foreign Application Priority Data

Nov. 21, 2013   (JP) ................. 2013-241202

(51) Int. Cl.
| | | |
|---|---|---|
| *H05K 7/02* | (2006.01) | |
| *H05K 7/04* | (2006.01) | |
| *B60K 37/02* | (2006.01) | |
| *B60K 35/00* | (2006.01) | |

(52) U.S. Cl.
CPC ............ *B60K 37/02* (2013.01); *B60K 35/00* (2013.01); *B60K 2350/1064* (2013.01); *B60K 2350/2039* (2013.01); *B60K 2350/2091* (2013.01)

(58) Field of Classification Search
USPC ........ 361/807, 809, 810; 345/30, 55, 84, 87, 345/94, 418, 581
See application file for complete search history.

(56) References Cited

U.S. PATENT DOCUMENTS

| | | | | |
|---|---|---|---|---|
| 6,352,322 B1 * | 3/2002 | Nakao | ............... | G02F 1/133308 312/223.1 |
| 8,442,604 B1 * | 5/2013 | Diebel | .................... | G03B 17/02 361/679.32 |
| 2003/0128549 A1 * | 7/2003 | Matsuura | ................. | B60Q 1/56 362/497 |
| 2005/0007645 A1 * | 1/2005 | Tonar | ................... | B60Q 1/2665 359/265 |
| 2012/0300306 A1 * | 11/2012 | Nagahama | ............... | G02B 1/10 359/601 |
| 2012/0328891 A1 * | 12/2012 | Suwa | ..................... | C09J 7/0246 428/522 |

FOREIGN PATENT DOCUMENTS

| | | | | |
|---|---|---|---|---|
| JP | 2009-003244 A | | 1/2009 | |
| JP | 2011-107054 | * | 6/2011 | ............ G01D 11/28 |

* cited by examiner

*Primary Examiner* — Hung S Bui

(74) *Attorney, Agent, or Firm* — Sughrue Mion, PLLC

(57) ABSTRACT

A display device includes a facing plate that covers around a first display unit, a second display unit that is disposed on a position corresponding to an opening on the facing plate at a reverse side of the facing plate, and a panel that closes the opening on the facing plate. The panel is set such that a surface position of a peripheral edge of the panel is flush with a surface position of a peripheral edge of the opening, and a smoke material that reduces transparency is used for the panel.

3 Claims, 5 Drawing Sheets

US 9,434,254 B2

DISPLAY DEVICE

CROSS-REFERENCE TO RELATED APPLICATIONS

The present application claims priority to and incorporates by reference the entire contents of Japanese Patent Application No. 2013-241202 filed in Japan on Nov. 21, 2013.

BACKGROUND OF THE INVENTION

1. Field of the Invention

The present invention relates to a display device used for an instrumental device mounted on a vehicle, for example.

2. Description of the Related Art

Japanese Laid-open Patent Publication No. 2009-3244 describes a display device mounted on a vehicle, the device including a second display unit mounted at a back of an opening formed on a facing plate that covers around a first display unit (display element).

FIGS. 4 and 5 illustrate a display device having the similar configuration to the display device described in Japanese Laid-open Patent Publication No. 2009-3244. This display device 100 is used as a combination meter in a vehicle, and has an opening 121 formed on a facing plate 120 that covers around a first display unit 110. Then, a second display unit 130 is mounted at the back of the opening 121.

The first display unit 110 is, for example, a speedometer displaying a traveling speed of a vehicle. The second display unit 130 is, for example, a device displaying various warning information pieces of the vehicle, and light sources 131 illuminating a warning design are mounted on an inner bottom part of the second display unit 130.

In the display device 100, the opening 121 of the facing plate 120 is closed by a panel 140. The panel 140 closing the opening 121 is made of a transparent or semitransparent plate member by which the design illuminated by the light sources 131 can visually be recognized. As illustrated in FIG. 5, the panel 140 is fixed by being pressed against the front surface of the second display unit 130 with a peripheral edge 121a at the reverse side of the opening 121.

However, when the panel 140 is mounted to be pressed against the front surface of the second display unit 130 by the peripheral edge 121a at the reverse side of the opening 121 as illustrated in FIG. 5, a step D is formed on the border between the facing plate 120 and the panel 140. Therefore, a joint between the facing plate 120 and the panel 140 is noticeable, which entails a problem of poor appearance.

SUMMARY OF THE INVENTION

In view of this, the present invention aims to solve the above-mentioned problem, and to provide a display device having a good-looking design in which a panel covering an opening on a facing plate is apparently integral with the facing plate by making a joint on the border between the panel and the facing plate unnoticeable.

It is an object of the present invention to at least partially solve the problems in the conventional technology.

The foregoing object of the present invention is attained by the configurations described below.

According to one aspect of the present invention, a display device includes a facing plate that covers around a first display unit to form a design around the first display unit, and that has an opening in which a display unit different from the first display unit is disposed; a second display unit disposed on a position corresponding to the opening at a reverse side of the facing plate; and a panel that closes the opening and transmits a design of the second display unit. Wherein, the panel is set such that a surface position of a peripheral edge of the panel is flush with a surface position of a peripheral edge of the opening, and the panel is made of a smoke material that reduces transparency.

According to another aspect of the present invention, surface texturing is applied on a surface of the panel and on a surface of the facing plate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The present invention has briefly been described above. The detail of the present invention will be made more apparent by reading through an embodiment (hereinafter referred to as an "embodiment") described below for embodying the present invention with reference to the accompanying drawings.

A preferable embodiment of a display device according to the present invention will be described below in detail with reference to the drawings.

Figure 1:
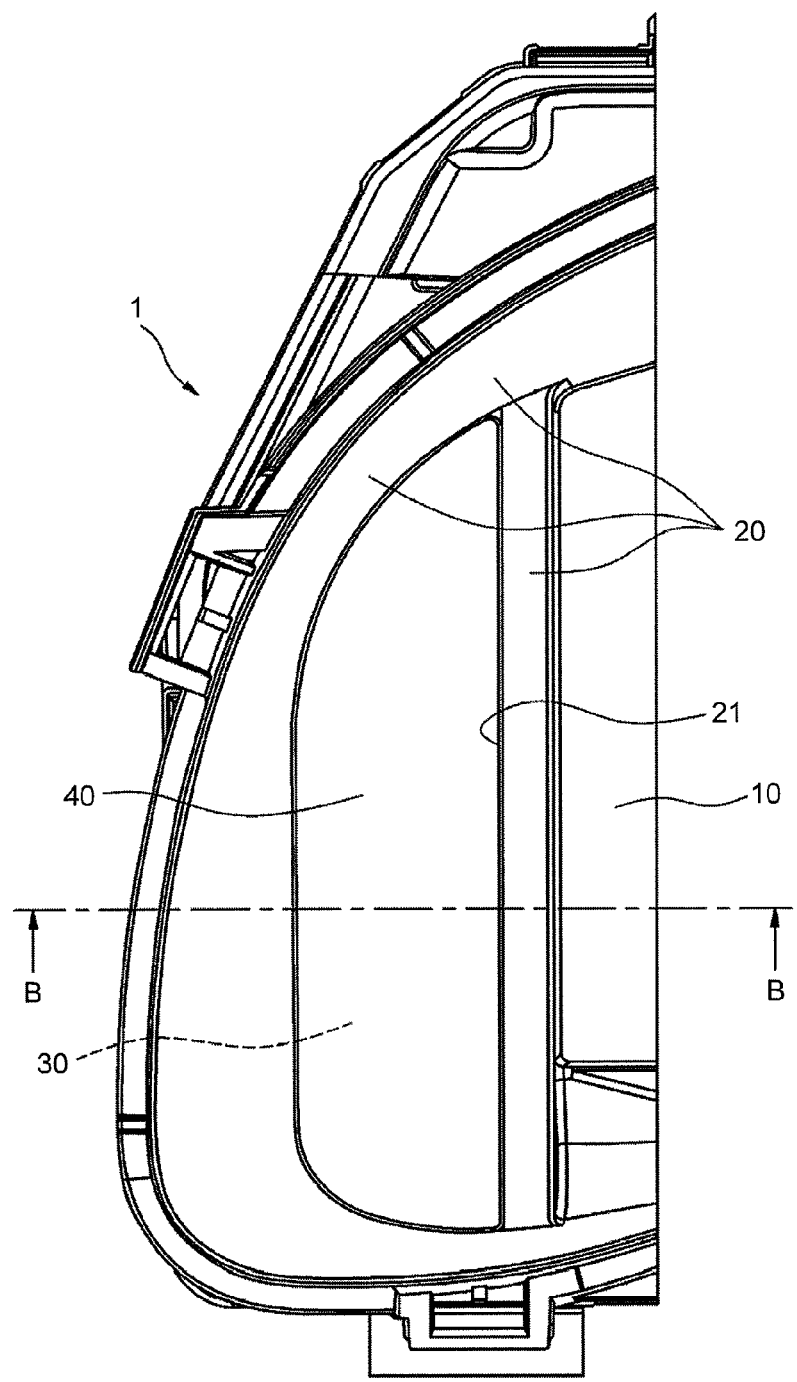
FIG. 1 is a front view illustrating an essential part of a display device according to one embodiment of the present invention.
Figure 2:
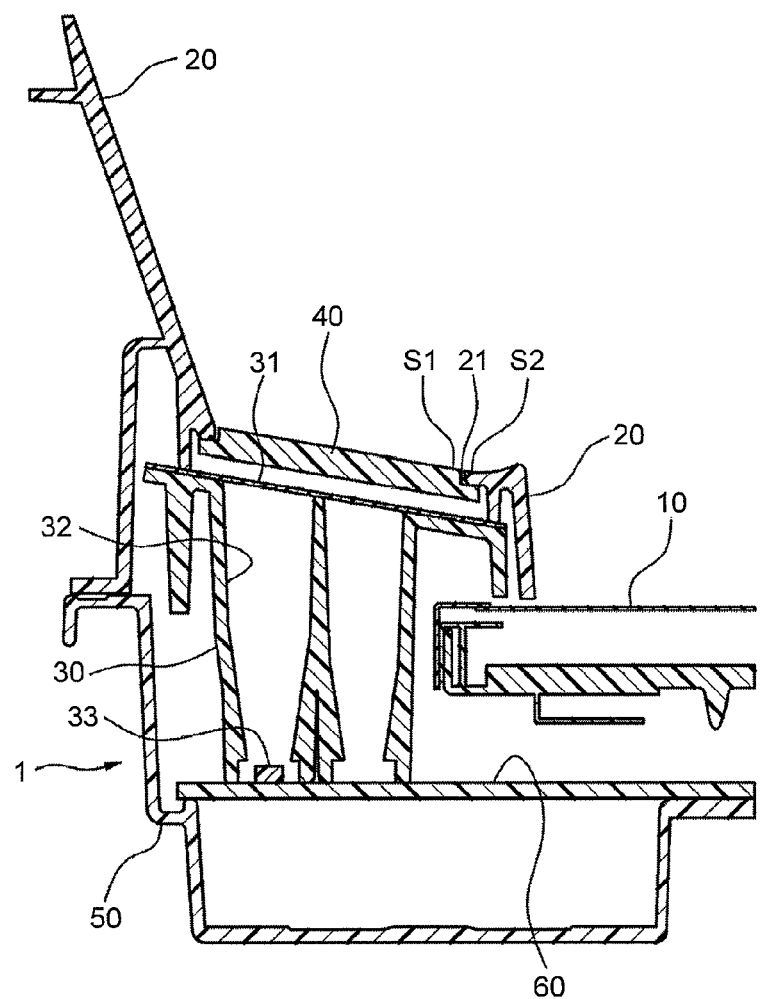
FIG. 2 is a sectional view taken along a line B-B in FIG. 1.
Figure 3:
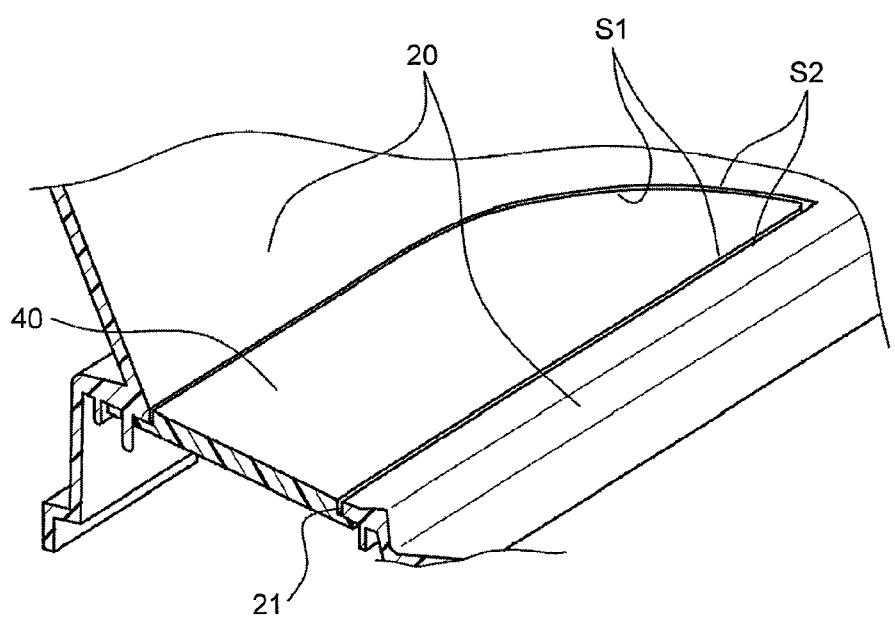
FIG. 3 is a perspective view of the display device according to one embodiment.
Figure 4:
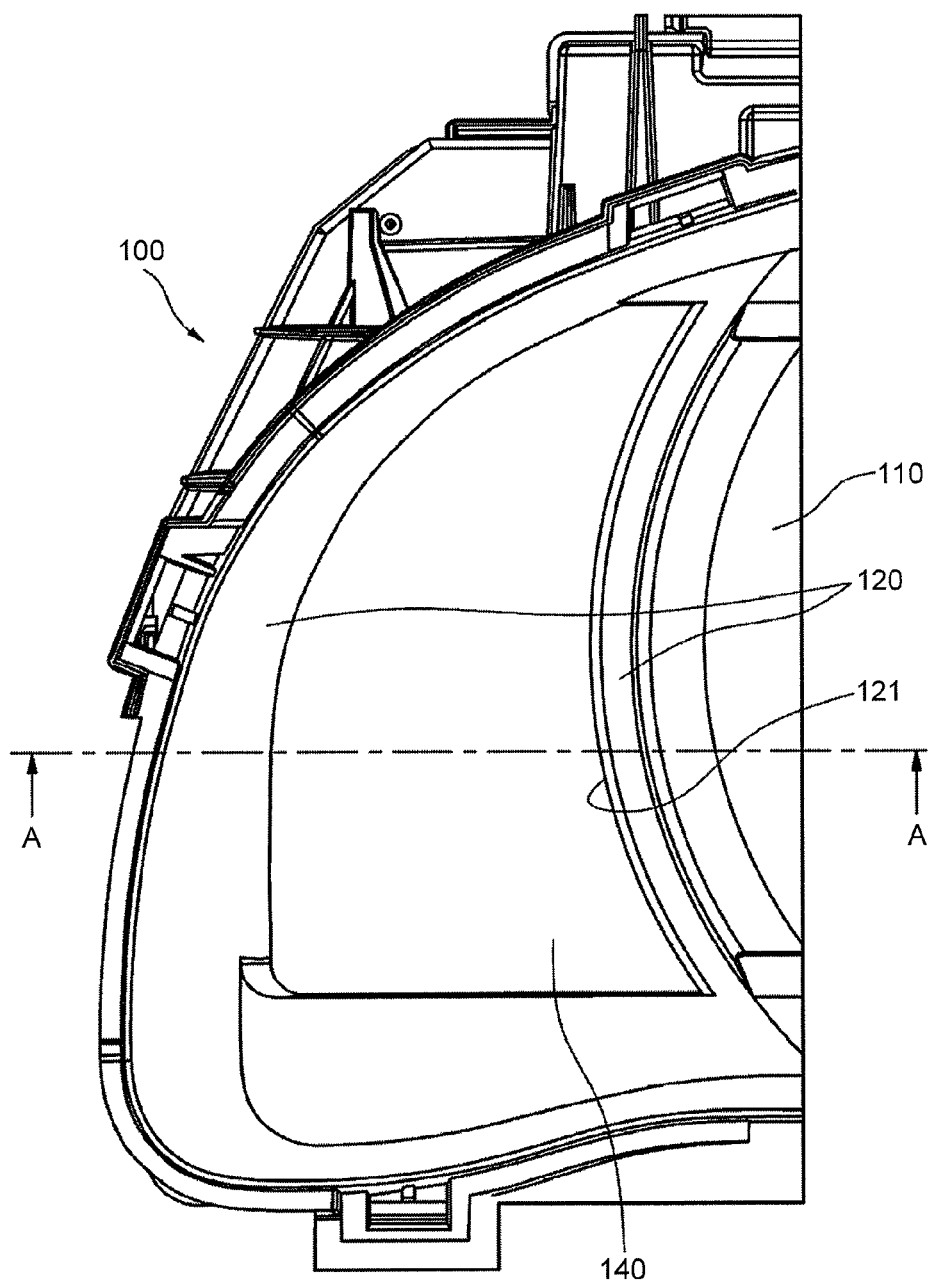
FIG. 4 is a front view illustrating an essential part of a conventional display device.
Figure 5:
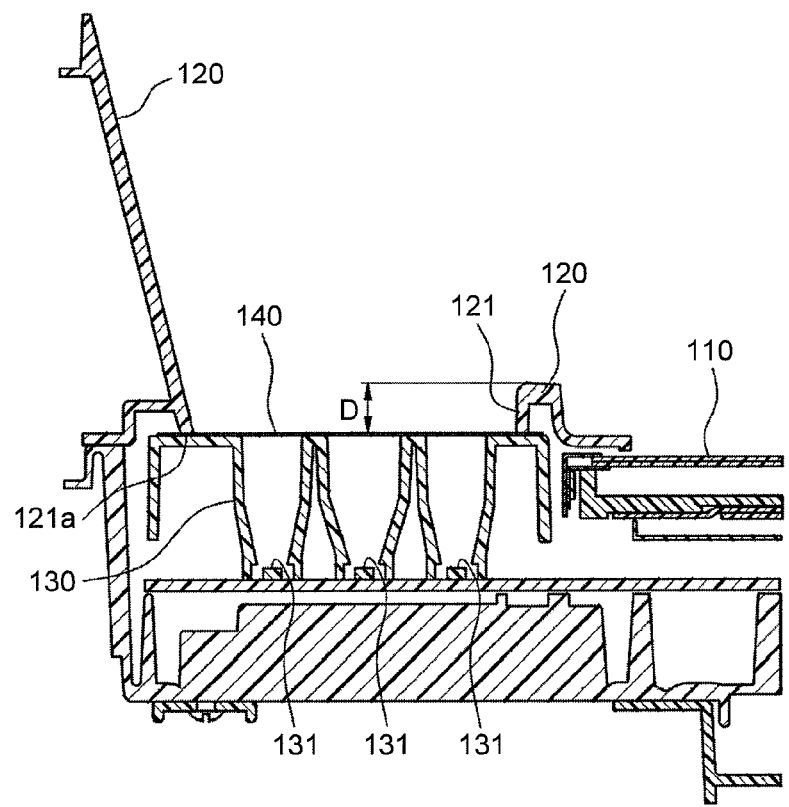
FIG. 5 is a sectional view taken along a line A-A in FIG. 4.

FIGS. 1 to 3 illustrate a display device according to one embodiment of the present invention, wherein FIG. 1 is a front view illustrating an essential part of the display device according to one embodiment of the present invention, FIG. 2 is a sectional view taken along a line B-B in FIG. 1, and FIG. 3 is a perspective view of the display device according to one embodiment.

A display device 1 according to one embodiment is used as a combination meter in a vehicle. The display device 1 includes a first display unit 10, a facing plate 20 covering around the first display unit 10, a second display unit 30 mounted on the reverse side of the facing plate 20, a panel 40 that closes an opening 21 formed on a region, corresponding to the second display unit 30, of the facing plate 20, and a device case 50.

The first display unit 10 is a device displaying an instrument, such as a speedometer displaying a traveling speed of a vehicle. A dial having a design as an instrument such as a speedometer and a liquid crystal display panel for displaying various information pieces are disposed on the first display unit 10, for example.

The facing plate 20 covers a region around the first display unit 10 to form a design around the first display unit 10. The facing plate 20 according to the present embodiment has the opening 21 in which the second display unit 30, which is different from the first display unit 10, is arranged. The opening 21 is elongated to correspond to the elongated shape (elongated shape in the vertical direction in FIG. 1) by which the second display unit 30 displays information.

In the present embodiment, the facing plate 20 is made of an opaque plate material. Surface texturing that is a matting process is performed onto the surface of the facing plate 20 for preventing a reflection of a user's face.

As illustrated in FIG. 2, the second display unit 30 is disposed at the position (region), corresponding to the opening 21, on the reverse side of the facing plate 20 in the region adjacent to the side of the first display unit 10.

As illustrated in FIG. 2, the second display unit 30 is a device displaying various warning information pieces of a vehicle. The second display unit 30 includes a design plate 31 having a warning design, a display unit housing 32 that is disposed at the reverse side of the design plate 31 for forming independent partition chambers for each warning information piece on the design plate 31, and a light source 33 disposed on the bottom part of each partition chamber of the display unit housing 32 for illuminating the warning design on the design plate 31.

The light source 33 illuminating the warning design is mounted on a control circuit board 60 disposed on the reverse side of the first display unit 10 and the second display unit 30. The control circuit board 60 also has mounted thereon a control member for controlling operations of various electronic components used for the first display unit 10.

The panel 40 closes the opening 21 on the facing plate 20. As illustrated in FIG. 3, the size of the panel 40 is set such that a surface position S1 of its peripheral edge is flush with a surface position S2 of the peripheral edge of the opening 21. The panel 40 in the present embodiment is a semitransparent plate material that transmits the illuminated design of the second display unit 30.

In the present embodiment, a smoke material that reduces transparency is used for the panel 40, in order to make the appearance of the panel 40 close to the appearance of the facing plate 20. The smoke material used for the panel 40 is formed by coloring a resin plate, or by applying a smoke film on one surface of a transparent resin plate.

In the present embodiment, the surface texturing similar to that applied on the surface of the facing plate 20 is applied on the surface of the panel 40, in order to make the appearance of the surface of the panel 40 close to the appearance of the facing plate 20.

The device case 50 is a housing that covers the reverse side of the display device 1, and supports the first display unit 10, the facing plate 20, the second display unit 30, and the control circuit board 60 in a predetermined positional relationship.

In the above-described display device 1 according to one embodiment, the surface position S1 of the peripheral edge of the panel 40 that closes the opening 21 on the facing plate 20 is flush with the surface position S2 of the peripheral edge of the opening 21 on the facing plate 20. Therefore, no step is formed on the border between the panel 40 and the facing plate 20. This configuration can make the joint on the border between the panel 40 and the facing plate 20 unnoticeable. In addition, a smoke material is used for the panel 40 to make the appearance of the panel 40 close to the appearance of the surface of the facing plate 20. Accordingly, this configuration can form a good-looking design in which the panel 40 is apparently integral with the facing plate 20.

In the display device 1 according to one embodiment, the similar surface texturing is applied on the surface of the panel 40 and on the surface of the facing plate 20, whereby both the panel 40 and the facing plate 20 have the similar matte appearance. Accordingly, the appearance of the panel 40 and the appearance of the facing plate 20 can be made more similar to each other.

Since both the panel 40 and the facing plate 20 have the matte appearance, a reflection of a user's face on the panel 40 and the facing plate 20 can be prevented.

The present invention is not limited to the above embodiment, and modifications and improvements are appropriately possible. Materials, shapes, sizes, numbers, and arrangement positions of the respective components in the above embodiment are optional, and not limitative, so long as they can achieve the present invention.

The features of the display device according to the embodiment of the present invention described above will be stated briefly and collectively in [1] to [2] below.

[1] The display device 1 includes the facing plate 20 that covers around the first display unit 10 to form the design around the first display unit 10, and that has the opening 21 in which the display unit different from the first display unit 10 is disposed; the second display unit 30 disposed on the position corresponding to the opening 21 at the reverse side of the facing plate 20; and the panel 40 that closes the opening 21 and transmits the design of the second display unit 30. Wherein, the panel 40 is set such that the surface position S1 of the peripheral edge of the panel 40 is flush with the surface position S2 of the peripheral edge of the opening 21, and the panel 40 is made of the smoke material that reduces transparency.

In the display device 1 having the configuration [1] above, the surface position S1 of the peripheral edge of the panel 40 closing the opening 21 on the facing plate 20 is flush with the surface position S2 of the peripheral edge of the opening 21 on the facing plate 20. Therefore, no step is formed on the border between the panel 40 and the facing plate 20. With this configuration, the joint on the border between the panel 40 and the facing plate 20 becomes unnoticeable. A smoke material is used for the panel 40. Therefore, a good-looking design in which the panel 40 is apparently integral with the facing plate 20 can be formed.

[2] The display device 1 having the configuration [1] above is characterized in that surface texturing is applied on the surface of the panel 40 and on the surface of the facing plate 20.

In the display device 1 having the configuration [2] above, surface texturing is applied on the surface of the panel 40 and the surface of the facing plate 20. Therefore, both the panel 40 and the facing plate 20 have similar matte appearance, whereby the appearance of the panel 40 and the appearance of the facing plate 20 can be made more similar to each other.

Since both the panel 40 and the facing plate 20 have the matte appearance, a reflection of a user's face on the panel 40 and the facing plate 20 can be prevented.

According to the display device 1 of the present embodiment, a good-looking design in which the panel 40 covering the opening 21 on the facing plate 20 is apparently integral with the facing plate 20 can be formed by making a joint on the border between the panel 40 in the display device 1 and the facing plate 20 unnoticeable.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
   a facing plate that covers around a first display unit to form a design around the first display unit, and that has an opening in which a display unit different from the first display unit is disposed;
   a second display unit disposed on a position corresponding to the opening at a reverse side of the facing plate; and
   a panel that closes the opening and transmits a design of the second display unit, wherein
   the panel is set such that a surface position of a peripheral edge of the panel is flush with a surface position of a peripheral edge of the opening,
   the panel is made of a smoke material that reduces transparency, and
   surface texturing is applied on a surface of the panel and on a surface of the facing plate.

2. The display device according to claim 1, wherein the surface texturing applied on the surface of the panel is similar to the surface texturing applied on the surface of the facing plate such that an appearance of the surface of the panel resembles an appearance of the surface of the facing plate.

3. The display device according to claim 1, wherein the surface of the panel on which surface texturing applied is located adjacent to the surface of the facing plate on which surface texturing applied.

* * * * *